April 11, 1939.  R. R. R. SARAZIN  2,154,359
DEVICE FOR BALANCING RECIPROCATING ENGINES
Filed July 25, 1936  2 Sheets-Sheet 1

INVENTOR
RAOUL ROLAND RAYMOND SARAZIN
ATTORNEYS

April 11, 1939.  R. R. R. SARAZIN  2,154,359
DEVICE FOR BALANCING RECIPROCATING ENGINES
Filed July 25, 1936   2 Sheets-Sheet 2
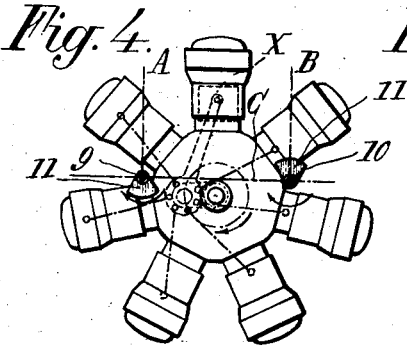
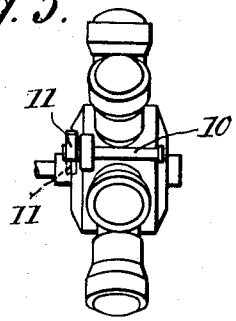
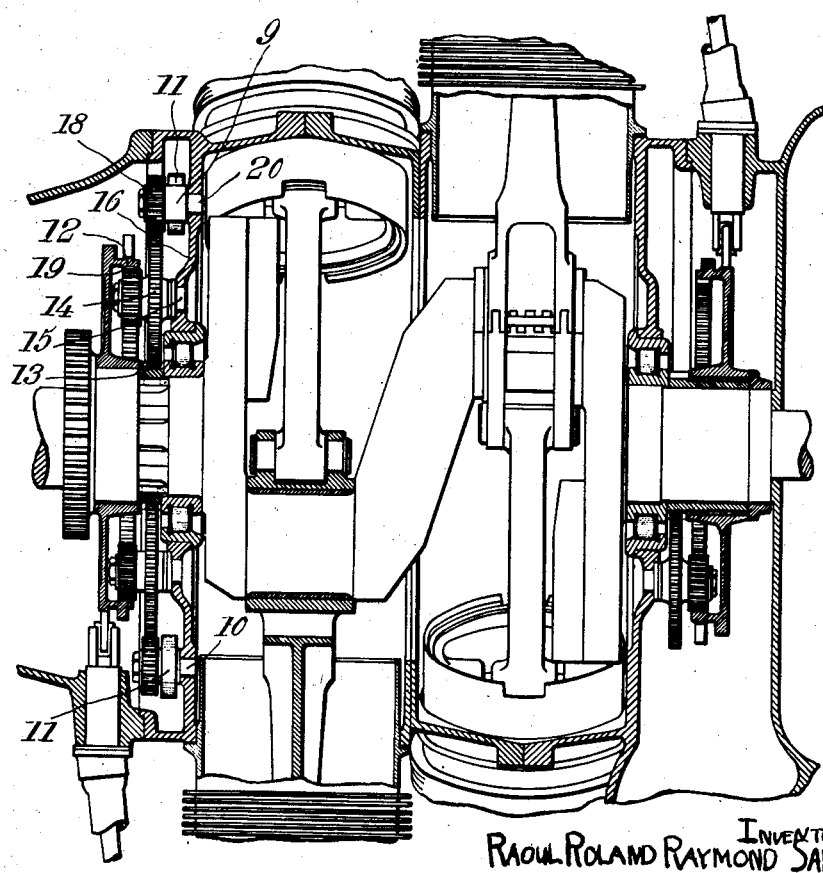

Patented Apr. 11, 1939

2,154,359

UNITED STATES PATENT OFFICE 2,154,359

DEVICE FOR BALANCING RECIPROCATING ENGINES

Raoul Roland Raymond Sarazin, Saint-Prix, France

Application July 25, 1936, Serial No. 92,654
In Belgium June 9, 1936

8 Claims. (Cl. 74—604)

This invention relates to devices for balancing reciprocating engines subjected to vibratory couples, and it is more especially although not exclusively concerned with devices of this kind as used for balancing radial engines as the invention offers particular advantages in this case.

It is known that certain reciprocating engines are subjected, when running, to vibrations which arise from periodic vibratory couples about an axis coinciding with the axis of rotation of the engine shaft and which tend to cause the engine to pivot periodically about the main axis.

These couples may be due either to the inertia of movable accessories, in which case they have a frequency equal to or greater than N, the speed of rotation of the engine shaft, or to the pressure of fluids circulating in the engine, in which case they have a frequency equal to that of the cycle or to a multiple thereof.

The object of the invention is to provide a device of the kind above referred to which is better adapted to meet the requirements of practice.

The invention consists primarily in that said device comprises masses of such a nature and so driven by the machine itself that their displacements give rise to inertia couples which counter-balance, at least in part, the above-mentioned vibratory couples.

Figure 1:
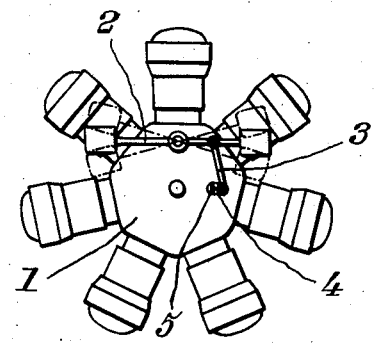
Figure 2:
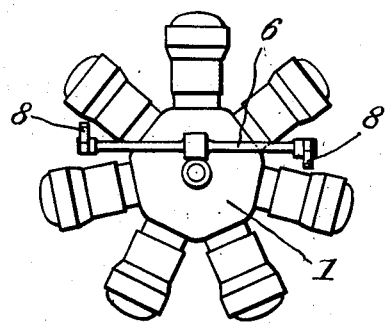
Figure 3:
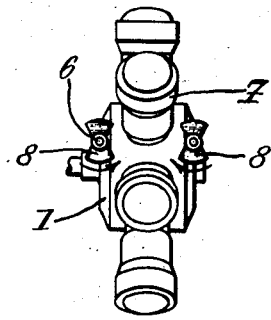

Preferred embodiments of the present invention will be hereinafter described with reference to the accompanying drawings, given merely by way of example and in which:

Figure 1 diagrammatically shows in end view a radial engine provided with a balancing device according to a first embodiment of the invention;

Figures 2 and 3 show, in end and side view, respectively, a similar engine provided with a balancing device in accordance with a second embodiment;

Figures 4 and 5, similar to Figures 2 and 3, show a similar engine having a third form of balancing device, while Figure 6 shows in part radial section on a larger scale, a radial engine having two banks of cylinders and fitted with a balancing device of the kind in Figures 4 and 5.

The example which will be hereinafter described with reference to the drawings concerns a radial engine having a main shaft which rotates at a speed N, the object of the invention being to balance the vibratory couples above mentioned.

According to Fig. 1, a counter-balance device 2, of the desired moment of inertia, is pivoted at an appropriate point in the casing 1 of the engine about an axis parallel to the engine shaft. This counter-balance device 2 is connected by a link 3 and a crank 4, or other equivalent mechanism, with a shaft 5 driven by the engine at a speed corresponding to the frequency of the vibratory couple to be neutralised.

In a second embodiment, shown in Figure 2, there are two shafts 6 and 7 which are supported by the casing 1 parallel to one another as well as to the plane of the vibratory couple to be neutralised and which are driven by the engine in opposite directions to one another but at the same speed, namely at a speed equal to that of the frequency of said couple. At the extremities of these shafts are fixed eccentric masses 8 which are disposed in such a manner that the resultants of the forces of inertia acting upon said masses form a couple balancing the vibratory couple. Thus for example the two masses carried by a single shaft may be disposed at an angle of 180° to one another, while the two shafts may be arranged so that the planes joining the axes of the shaft to the centre of gravity of the masses which they carry will both be parallel to the plane of the vibratory couple. I therefore produce in this way an anti-vibratory couple without producing any resultant force.

However, I have found that it is particularly advantageous, in order to obtain this result, to employ the arrangement in Figures 4 to 6 which will now be described.

As shown, two shafts 9 and 10 are supported by the casing 1 parallel one to another and perpendicular to the plane of the vibratory couple to be balanced. These shafts are driven by the engine in the same direction as the main shaft and at a speed equal to that of the frequency of said couple. To each of these shafts is fixed at least one eccentric mass 11, the two masses being arranged on each shaft at an angle of 180° to one another, and the parallel planes A and B joining the axis of each shaft to the centre of gravity of the mass carried thereby being arranged so that they are perpendicular to the plane C joining the shaft axes at the time when the vibratory couple passes through its maximum, so that the planes A, B, C, will coincide when the vibratory couple becomes zero.

In a motor having one bank or two banks of cylinders the crank system of which consists of a master connecting rod having a head to which the heads of the connecting rods are articulated about axes distinct from that of the sleeve of the master connecting rod, if it is desired to have the plane C perpendicular to the axis of cylinder X of the master connecting rod, planes A and B must always be perpendicular to the plane of the crank pins. In other words, the shafts 9, 10 must be driven at the same speed as the crank shaft so as to produce a counter-rotary moment or couple having the same period as the couple to be balanced, the period of this latter being equal to the period of rotation of the crank shaft. In all cases and whatever may be to position of plane C planes A and B must coincide and the masses must be directed the one towards the other at the upper dead points of the cylinders of the master connecting rod.

It will be readily understood that the centres of gravity of the two masses will preferably be disposed in the same plane parallel to the plane of the couple to be balanced.

Driving of the shafts 9 and 10 can be effected by any appropriate means. However, it is convenient to this end to use the same mechanism as used for the engine distribution, particularly in the case of radial engines. It is known that motors of this type have in general a distribution mechanism comprising a cam plate 12 (Figure 6) which is co-axial with the engine shaft and driven at an appropriate speed by a train of gears.

In certain engines this gear train consists of a toothed wheel 13 driven from the engine shaft, intermediate pinions 14 rotating about axes 15 fixed on the casing 16 and an internal ring gear 19 carried by the plate 12. Where such a mechanism is provided, it will be easy to drive the shafts 9 and 10 from the pinions 14 by having them meshed with toothed wheels 18 of appropriate characteristics carried on said shafts 9 and 10. In this case, for example, the shafts 9 and 10 will be pivoted on axes 20 similar to axes 15 and like them carried by the casing.

It will be understood that in the case of radial engines with two banks of cylinders which have identical distributing mechanisms in the front and in the rear, the shafts 9 and 10 can be provided either on one or on both sides of the engine.

In consequence, a device is obtained the function and advantages of which will sufficiently appear from what precedes, so that it will be unnecessary to enter into further explanation.

As will be understood, especially from what has been said above, the invention is not limited only to these applications nor to the particular embodiments which have been specifically described as there might be changes made therein, especially where in order to balance several vibratory couples of different periods, use would be made of several arrangements similar to those which have been described, without departing from the principle of the present invention as comprehended within the scope of the appended claims.

What I claim is:

1. In a reciprocating motion engine of the radial cylinder type including a rotating shaft and in which vibratory couples are produced, a device for obviating the effects of said couples, which comprises, in combination, two shafts, parallel to said first mentioned shaft on either side thereof, means for driving said shafts in the same direction and at the same speed as the first mentioned shaft, and at least one eccentric mass carried by each of these two second mentioned shafts in a rigid manner, said masses being in relative positions at 180° to each other with reference to their respective shafts.

2. A balancing device according to claim 1 in which said masses are so positioned with respect to their respective shafts that the parallel planes passing each through the axis of each of said last mentioned shafts and through the center of gravity of the corresponding mass are at right angles to the plane passing through both of the axes of these last mentioned shafts when the vibratory couple is maximum.

3. In a radial engine according to claim 1 including a distribution mechanism, a balancing device according to claim 1 in which the two second mentioned shafts are operatively connected with said distribution mechanism.

4. In an engine having a crankshaft, a main connecting rod pivoted to the crankshaft and at least one auxiliary connecting rod pivoted to the main connecting rod about an axis different from the axis of the pivot of the main connecting rod, means for counter-balancing the reaction of the rotary moment acting on the engine frame and produced by the inertia forces, said means comprising masses each pivoted to move about an axis fixed with respect to the engine frame, and means to move said masses so that said masses produce a plurality of simultaneous oppositely directed forces on opposite sides of the crankshaft so as to cause a counter-rotary moment in at least one plane perpendicular to the axis of the crankshaft having a period equal to the period of rotation of the crankshaft.

5. In an engine having a crankshaft, a main connecting rod pivoted to the crankshaft and at least one auxiliary connecting rod pivoted to the main connecting rod about an axis different from the axis of the pivot of the main connecting rod, means for counter-balancing the reaction of the rotary moment acting on the engine frame and produced by the inertia forces, said means comprising a lever pivoted to oscillate in a plane perpendicular to the crankshaft about an axis fixed with respect to the engine frame, and parallel to the axis of the crankshaft, masses mounted on the ends of said lever, and means to impart to said lever oscillations having a period equal to the period of rotation of the crankshaft, whereby said masses produce a plurality of simultaneous oppositely directed forces on opposite sides of the crankshaft so as to cause a counter-rotary moment in at least one plane perpendicular to the axis of the crankshaft having a period equal to the period of rotation of the crankshaft.

6. In an engine having a crankshaft, a main connecting rod pivoted to the crankshaft and at least one auxiliary connecting rod pivoted to the main connecting rod about an axis different from the axis of the pivot of the main connecting rod, means for counter-balancing the reaction of the rotary moment acting on the engine frame and produced by the inertia forces, said means comprising parallel shafts each mounted to turn about an axis fixed with respect to the engine frame and transverse to the crankshaft, each of said shafts having at its end two eccentric masses relatively staggered by 180°, and means for rotating said shafts in opposite directions at a speed equal to that of the crankshaft, whereby said masses produce a plurality of simultaneous oppositely directed forces on opposite sides of the crankshaft so as to cause a counter-rotary moment in at least one plane perpendicular to the axis of the crankshaft having a period equal to the period of rotation of the crankshaft.

7. In an engine having a crankshaft, a main connecting rod pivoted to the crankshaft and at least one auxiliary connecting rod pivoted to the main connecting rod about an axis different from the axis of the pivot of the main connecting rod, means for counter-balancing the reaction of the rotary moment acting on the engine frame and produced by the inertia forces, said means comprising two shafts mounted at opposite sides of the crankshaft to turn about axes fixed with respect to the engine frame and parallel to the axis of the crankshaft, eccentric masses keyed on said shafts, and means to rotate said shafts in the same direction and at the same velocity as the crankshaft, so that said masses produce a plurality of simultaneous oppositely directed forces on opposite sides of the crankshaft so as to cause a counter-rotary moment in at least one plane perpendicular to the axis of the crankshaft having a period equal to the period of rotation of the crankshaft.

8. In a radial engine as claimed in claim 4, and having a distribution mechanism, said counterbalancing means being operatively connected with said distribution mechanism.

RAOUL ROLAND RAYMOND SARAZIN.